United States Patent [19]

Pearman et al.

[11] Patent Number: 5,621,821
[45] Date of Patent: Apr. 15, 1997

[54] APPARATUS AND METHOD FOR DETECTING DISTORTIONS IN PROCESSED IMAGE DATA

[75] Inventors: James B. Pearman, Glendale, Calif.; Peter Kavanagh, Guildford, England

[73] Assignees: Sony Corporation, Tokyo, Japan; Sony United Kingdom Limited, Weybridge, England

[21] Appl. No.: 365,057

[22] Filed: Dec. 28, 1994

Related U.S. Application Data

[63] Continuation of Ser. No. 57,473, May 6, 1993, abandoned.

[30] Foreign Application Priority Data

Jun. 4, 1992 [GB] United Kingdom .................. 9211862

[51] Int. Cl.$^6$ ........................................... G06K 9/00
[52] U.S. Cl. .......................... 382/254; 345/150; 382/169
[58] Field of Search .................................. 382/276, 282, 382/168, 169, 254, 274; 345/147, 150, 145; 358/518, 520, 521, 522, 537; 395/131, 133, 155

[56] References Cited

U.S. PATENT DOCUMENTS 5,012,333  4/1991  Lee et al. .............................. 358/520
5,042,077  8/1991  Burke ..................................... 382/51
5,103,407  4/1992  Gabor .................................. 395/131
5,222,206  6/1993  Liao ..................................... 340/703

FOREIGN PATENT DOCUMENTS 2210533  6/1989  United Kingdom .
2223148  3/1990  United Kingdom .

OTHER PUBLICATIONS

Levine, Martin D. *Vision in Man and Machine*, McGraw–Hill, 1985, pp. 172–173 and 289–294.

*Primary Examiner*—Joseph Mancuso
*Attorney, Agent, or Firm*—William S. Frommer; Alvin Sinderbrand

[57] ABSTRACT

A system for the analysis of image data 48 that has been subject to one or more processing operations is described. The image data is displayed using a display palette 30 which maps pixel values PV to displayable appearances RGB, I. Under user control, a sub-section of the pixel values are mapped to enhanced displayable appearances so as to make small variations in the pixel values more visible. A palette scale 54 illustrating the mapping being performed by the palette 30 is displayed adjacent to the image 48 being analyzed. In addition, a graph 60 of the variation of pixel value along a given analysis line 62 is displayed to assist quantative analysis.

1 Claim, 7 Drawing Sheets

APPARATUS AND METHOD FOR DETECTING DISTORTIONS IN PROCESSED IMAGE DATA

This application is a continuation of application Ser. No. 08/057,473, filed May 6, 1993 now abandoned.

BACKGROUND OF THE INVENTION

1. Field of the Invention

This invention relates to the field of the analyzing image data processing operations.

2. Description of the Prior Art

The technical field of the processing of image data is becoming ever more complex. In particular, the number and sophistication of processing operations performed upon image data between its capture and eventual display to an end user are increasing, e.g. spatial filtering, domain transformation/retransformation and data compression/decompression. In addition, there is continuous pressure to improve, or at least maintain, image quality despite these extra processing operations.

It is advantageous when developing a new system for processing image data to simulate the processing operations that are to be performed so that any unforseen problems and effects can be identified and eliminated, as far as possible, before a large commitment is made to developing the full working system. To this end, the image processing can be simulated using a general purpose computer. Whilst such general purpose computers are unlikely to be able to process the image data at the full rate that will eventually be required, they are well suited to simulating the processing on a small number of test images or patterns. The software running on the computer system will be arranged to mimic the sequence of signal processing operations that are to be performed in the eventual working system.

It is an object of the invention to enhance the ease of use and utility of simulation.

SUMMARY OF THE INVENTION

This invention provides apparatus for analyzing processing operations performed upon image data, said apparatus comprising:

(i) an image memory for storing an array of pixel values comprising image data that has been subject to one or more processing operations that are to be analyzed;

(ii) a display palette for storing mapping information defining a mapping between each pixel value within a range of pixel values and a corresponding directly representative displayable appearance within a range of directly representative displayable appearances;

(iii) a display coupled to said image memory and said display palette and responsive to said array of pixel values and said mapping information for displaying an image representing said image data;

(iv) enhancing means for modifying said mapping information to define a mapping between each pixel value within a sub-section of said range of pixel values and a corresponding enhanced displayable appearance within a range of enhanced displayable appearances; and (v) user control means responsive to user input for varying the position of said sub-section within said range of pixel values.

The invention both recognises and solves a problem that occurs when seeking to analyze the results of such simulation. It will be appreciated that with the increasing levels of picture quality that are being achieved, the remaining distortions and artifacts of signal processing operations that the simulation is intended to uncover can be difficult to identify. In many cases the distortions in the final image are so slight that only a minority of people (people having a so called "golden eye") are able to identify these distortions. This problem is compounded still further by the comparatively limited quality of display that a general purpose computer can provide. In a typical case, whereas broadcast quality image data in a digital form might on average have 16 bits per pixel, a typical computer will only allow 8 bits per pixel. Thus, a characteristic distortion pattern that would be visible in a 16 bits per pixel broadcast system may be on the edge of the resolution threshold of an 8 bits per pixel computer system making it significantly more difficult to identify.

The invention solves this problem by allowing the relatively limited display facilities of a computer to be used to better effect. A sub-section of the full range of directly representative displayable appearances is mapped to an enhanced range of displayable appearances. The enhanced range is chosen such that adjacent pixel values have an increased difference in visual appearance so that minor distortions can be more easily observed. This technique moves in the opposite direction to the usual prejudice in this field in that the realism (quality) with which the image is reproduced is disregarded in the interests of making the identification of distortions easier.

As an example of the operation of the invention, consider the case of an image including an object of uniform appearance. Ideally, even after several processing operations have been performed upon the image data representing this object, the pixel values should still all be the same. However, a distortion may be introduced that causes the pixel value to vary by, for example, only one magnitude step. To the majority of observers the variation in appearance between adjacent pixel values would be undetectable. However, with the present invention these adjacent pixel values can be arranged to have enhanced displayable appearances such that the visible difference between pixel values is increased. This allows the distortion to be more easily identified.

A further advantage of the invention is that the existing computer architecture can be exploited to implement the invention and allow a rapid alteration of the sub-section that is enhanced. This can be achieved since the display pallet will typically contain less than 1 Kb of data that defines the appearance of perhaps 1 Mb of image data being displayed. Changing a relatively small amount of data stored in the display pallet can be achieved at high speed and yet radically affects the appearance of the entire image. Such high speed operation increases the usefulness of the apparatus by allowing a higher degree of interactivity with the user thereby enabling an image to be more effectively searched for distortions.

It will be appreciated that the invention may be used upon colour images, but in preferred embodiments said range of directly representative displayable appearances is a range of monochrome displayable appearances.

This feature recognises that it is generally easier to identify and understand distortions in the data if only a single component is analyzed at one time. This component could be luminance, colour difference or one of a set of RGB components.

The enhanced displayable appearances ape chosen so that the differences between adjacent pixel values can be more readily observed. In practice, the enhanced displayable appearances could be arranged with exaggerated luminance differences between adjacent pixel values in a monochrome image. However, in preferred embodiments said range of enhanced displayable appearances is a range of polychrome displayable appearances.

The use of differing colours within the range of enhanced displayable appearances makes differences particularly visible.

As mentioned above, in order to effectively analyze an image, the user must be able to move the position of the sub-section that corresponds to the enhanced displayable appearances. In preferred embodiments of the invention said display is operable to display a palette scale representation formed of a monotonically varying range of pixel values, each of said pixel values being displayed with whichever of said directly representative displayable appearance or said enhanced displayable appearance that is defined in said display palette.

The display of the palette scale representation as well as the image being analyzed increases ease of use by allowing a user to identify a portion of the image to be investigated, recognise its directly displayable appearance within the palette scale and move the sub-section of enhanced displayable appearances to overlay that region.

A form of palette scale that is intuitively understandable by a user is one in which said palette scale representation comprises a bar of monotonically varying pixel values with said sub-section corresponding to a portion of said bar.

This intuitive understanding is further improved in embodiments of the invention in which user control means is operable to allow a user to vary the position of said portion along said bar so as to thereby define the position of said sub-section within said range of pixel values.

In order to assist in the quantative analysis of distortions once they have been identified, preferred embodiments of the invention provide means responsive to user input for selecting an analysis line through said image and means for displaying a graph of pixel value against displacement along said analysis line adjacent to said image.

The invention also provides a method of analyzing processing operations performed upon image data, said method comprising the steps of:

(i) storing an array of pixel values comprising image data that has been subject to one or more processing operations that are to be analyzed;

(ii) storing mapping information defining a mapping between each pixel value within a range of pixel values and a corresponding directly representative displayable appearance within a range of directly representative displayable appearances;

(iii) modifying said mapping information to define a mapping between each pixel value within a sub-section of said range of pixel values and a corresponding enhanced displayable appearance within a range of enhanced displayable appearances;

(iv) displaying an image representing said image data in dependence upon said array of pixel values and said mapping information; and (v) varying the position of said sub-section within said range of pixel values in dependence upon user input.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
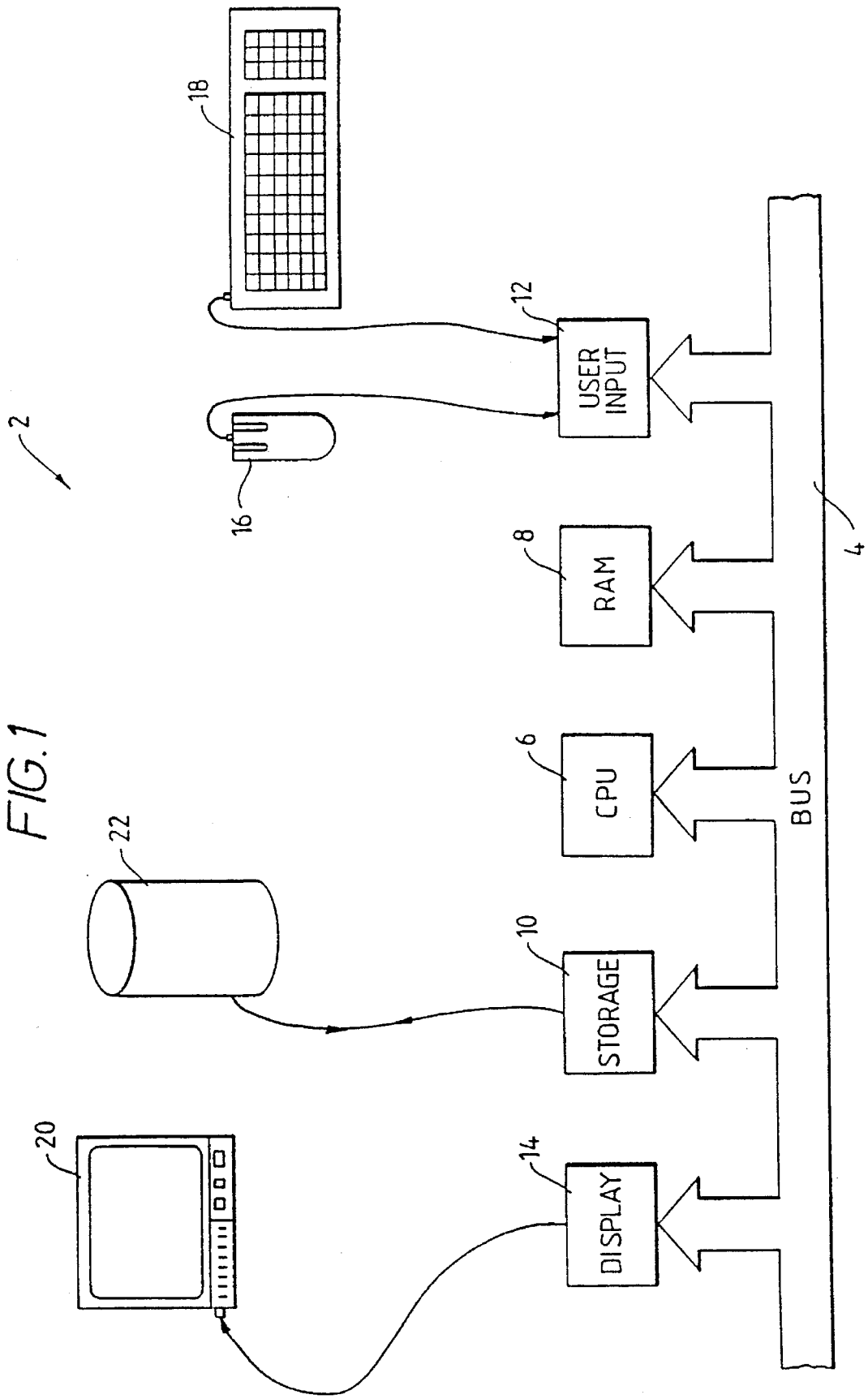
FIG. 1 schematically illustrates the architecture of a general purpose computer.

FIG. 1 illustrates the architecture of a general purpose computer system 2. A main bus 4 interconnects a central processor unit 6, a main memory 8, a storage controller 10, a user input device interface 12 and a display driver 14. User input devices, such as a mouse 16 and a keyboard 18, are connected to the user input device interface 12. A computer monitor 20 is connected to the display device driver 14. A permanent storage device, such as a hard disc 22, is connected to the storage device controller 10.

The general purpose computer 2 is controlled to perform the desired operations by computer program. The computer program can be written in different computer languages and can have various different forms all producing the same external operation. The sample image data upon which the simulation is to be performed is stored on the hard disc drive 22. The processing operations being simulated by the software may be compression and decompression or perhaps a filtering operation involved in a domain transformation.

Figure 2:
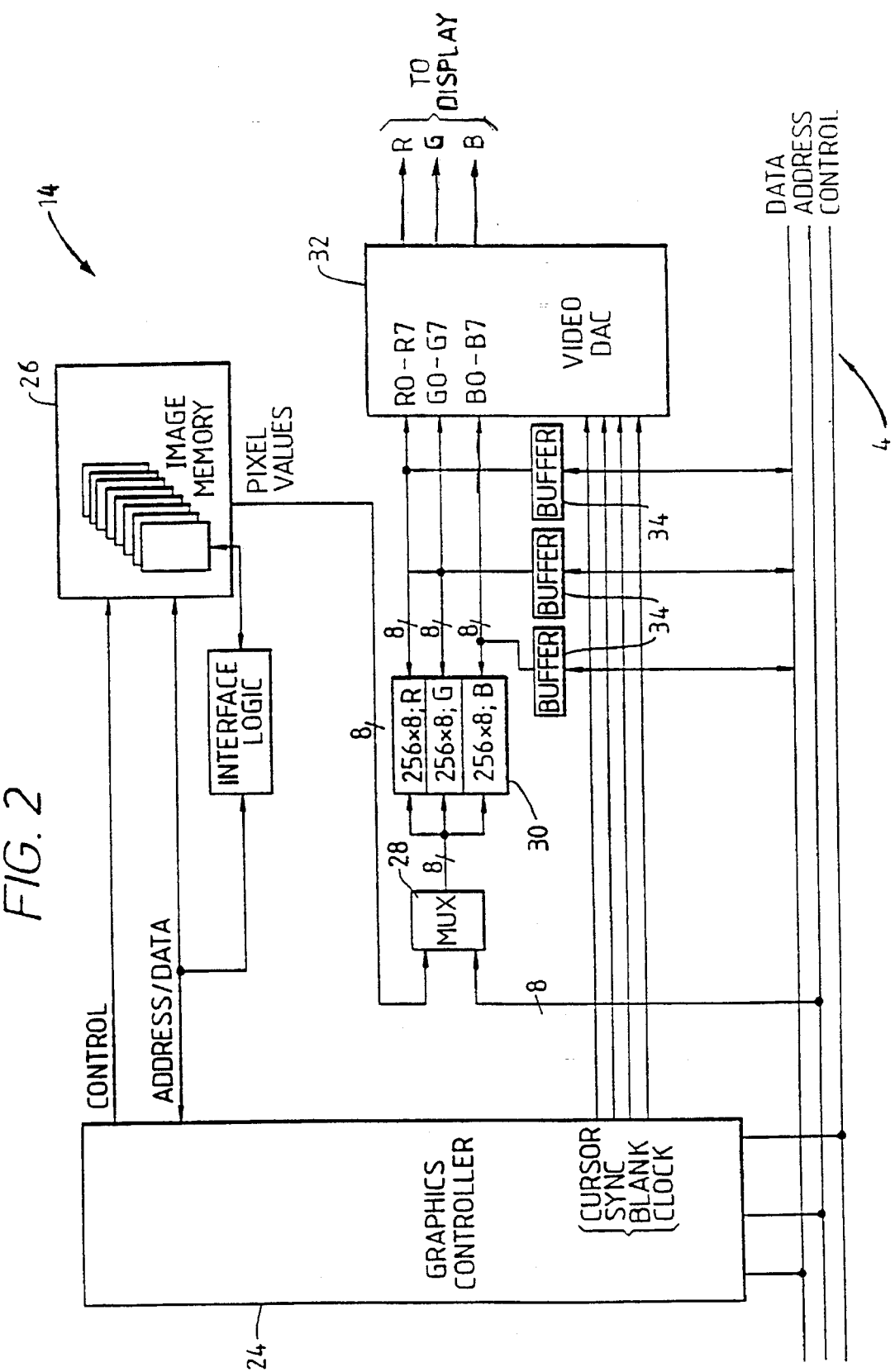
FIG. 2 illustrates a display driver of a general purpose computer.

FIG. 2 illustrates the display device driver 14 in more detail. Data, address and control signals are passed to a graphics controller 24 via the main bus 4. The data representing the pixel values to be displayed is written from the graphics controller 24 into the image memory 26. Pixel values (PV) are read out of the image memory 26 via a multiplexer 28 to a display palette 30.

The display palette 30 maps the 8 bit pixel values into three 8 bit numbers each representing the magnitude of a respective red, green and blue component for that pixel value. The three 8 bit numbers from the display palette 30 are fed to a digital-to-analog converter 32 where they are converted into analog red, green and blue component values for driving the monitor 20.

The data stored within the display palette 30 defining the mapping of pixel values to components is loaded into the display palette 30 via buffers 34 under control of address signals input via the multiplexer 28 during a palette loading mode. It will be seen from this arrangement that the display device driver 14 supports 256 different colours that may be simultaneously displayed. It is possible to vary the colours loaded into the display palette 30 over a much wider range, but only 256 different colours can be used any one time.

The display palette 30 contains 3*256 bytes, which is a relatively small amount of data that can be rapidly modified (totally or in part) via the main bus 4.

Figure 3:
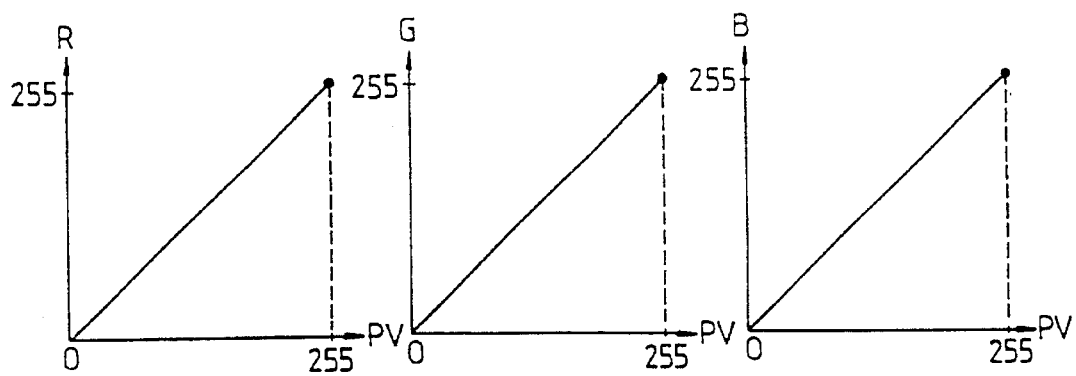
FIG. 3 illustrates a conventional mapping of pixel values to directly representative displayable appearances.

FIG. 3 illustrates the mapping of pixel values to directly displayable appearance values that are stored within the display palette 30 when the enhancement feature is not being used. It will be observed from FIG. 3 that each of the three components remains in balance throughout the range of pixel values and so the image that is produced will be a monochrome (black and white) image. An increase in pixel value corresponds to an increase in luminance.

Table 1 below illustrates the data that would be stored within the display palette 30 to perform such a mapping.

TABLE 1

| Pixel Value | R Component | G Component | B Component |
|---|---|---|---|
| 0 | 0 | 0 | 0 |
| 1 | 1 | 1 | 1 |
| 2 | 2 | 2 | 2 |
| : | : | : | : |
| n − 2 | n − 2 | n − 2 | n − 2 |
| n − 1 | n − 1 | n − 1 | n − 1 |
| n | n | n | n |
| n + 1 | n + 1 | n + 1 | n + 1 |
| n + 2 | n + 2 | n + 2 | n + 2 |
| n + 3 | n + 3 | n + 3 | n + 3 |
| n + 4 | n + 4 | n + 4 | n + 4 |
| n + 5 | n + 5 | n + 5 | n + 5 |
| n + 6 | n + 6 | n + 6 | n + 6 |
| n + 7 | n + 7 | n + 7 | n + 7 |
| n + 8 | n + 8 | n + 8 | n + 8 |
| n + 9 | n + 9 | n + 9 | n + 9 |
| n + 10 | n + 10 | n + 10 | n + 10 |
| n + 11 | n + 11 | n + 11 | n + 11 |
| n + 12 | n + 12 | n + 12 | n + 12 |
| n + 13 | n + 13 | n + 13 | n + 13 |
| n + 14 | n + 14 | n + 14 | n + 14 |
| n + 15 | n + 15 | n + 15 | n + 15 |
| n + 16 | n + 16 | n + 16 | n + 16 |
| n + 17 | n + 17 | n + 17 | n + 17 |
| : | : | : | : |
| 254 | 254 | 254 | 254 |
| 255 | 255 | 255 | 255 |

Figure 4:
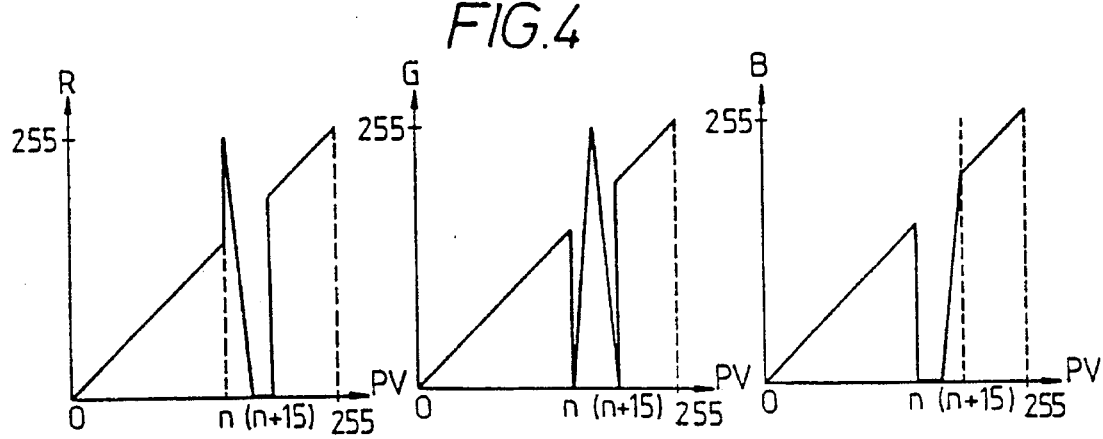
FIG. 4 illustrates the mapping of FIG. 3 modified in accordance with one embodiment of the invention.

FIG. 4 illustrates the mapping performed by the display palette 30 in accordance with one embodiment of the invention. In contrast with FIG. 3, it will be observed that between the pixel values n and (n+15) the mapping does not follow the monotonic increase that produced the previous monochrome image for that portion of pixel values. More particularly, the balance between the respective components is widely varied over this range and the complete dynamic range of the component values spanned. In this way, enhanced displayable appearances ape generated in which adjacent pixel values map to more readily visually distinguishable displayable appearances. An example of the data that would be stored in the display palette 30 is given in Table 2 below.

TABLE 2

| Pixel Value | R Component | G Component | B Component |
|---|---|---|---|
| 0 | 0 | 0 | 0 |
| 1 | 1 | 1 | 1 |
| 2 | 2 | 2 | 2 |
| : | : | : | : |
| n − 2 | n − 2 | n − 2 | n − 2 |
| n − 1 | n − 1 | n − 1 | n − 1 |
| n | 255 | 0 | 0 |
| n + 1 | 223 | 32 | 0 |
| n + 2 | 191 | 64 | 0 |
| n + 3 | 159 | 96 | 0 |
| n + 4 | 127 | 128 | 0 |
| n + 5 | 95 | 160 | 0 |

TABLE 2-continued

| Pixel Value | R Component | G Component | B Component |
|---|---|---|---|
| n + 6 | 63 | 192 | 0 |
| n + 7 | 31 | 224 | 0 |
| n + 8 | 0 | 255 | 0 |
| n + 9 | 0 | 223 | 32 |
| n + 10 | 0 | 191 | 64 |
| n + 11 | 0 | 159 | 96 |
| n + 12 | 0 | 127 | 128 |
| n + 13 | 0 | 95 | 160 |
| n + 14 | 0 | 63 | 192 |
| n + 15 | 0 | 32 | 223 |
| n + 16 | n + 16 | n + 16 | n + 16 |
| n + 17 | n + 17 | n + 17 | n + 17 |
| : | : | : | : |
| 254 | 254 | 254 | 254 |
| 255 | 255 | 255 | 255 |

Figure 5:
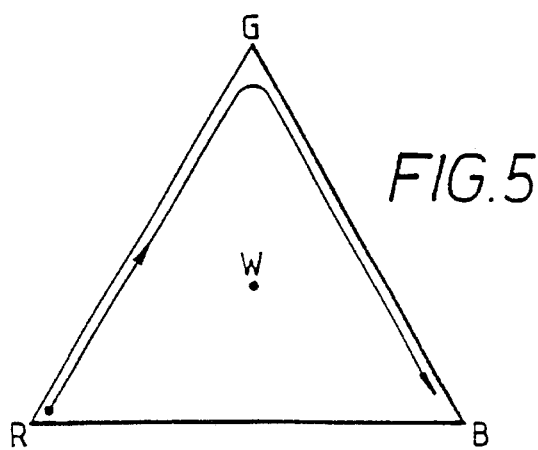
FIG. 5 illustrates the variation in colour of the enhanced displayable appearances of FIG. 4.

FIG. 5 is a colour chart illustrating the variation of colour within the range of enhanced displayable appearances given by the mapping of FIG. 4 and Table 2. Each of the vertexes of the chart represent 100% of a particular colour component. A point at the centre of the chart (W) represents a balance between the three components that gives a white output. It will be seen that the enhanced range starts with pure red then progresses via a mix of red and green to pure green. From pure green the enhanced range progresses via a mix of green and blue to pure blue.

Figure 6:
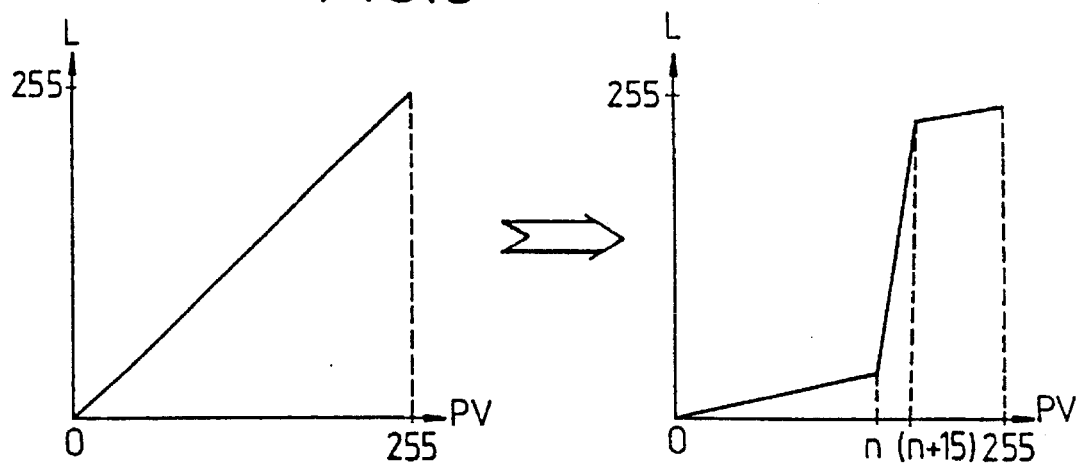
FIG. 6 illustrates an alternative modification that may be performed.

FIG. 6 illustrates an alternative modification to the data within the display palette 30 that yields an enhanced range. In this case all the data is modified to give a monochrome display in which the variation in luminance with pixel value is increased over the enhanced range n to (n+15).

Figure 7:
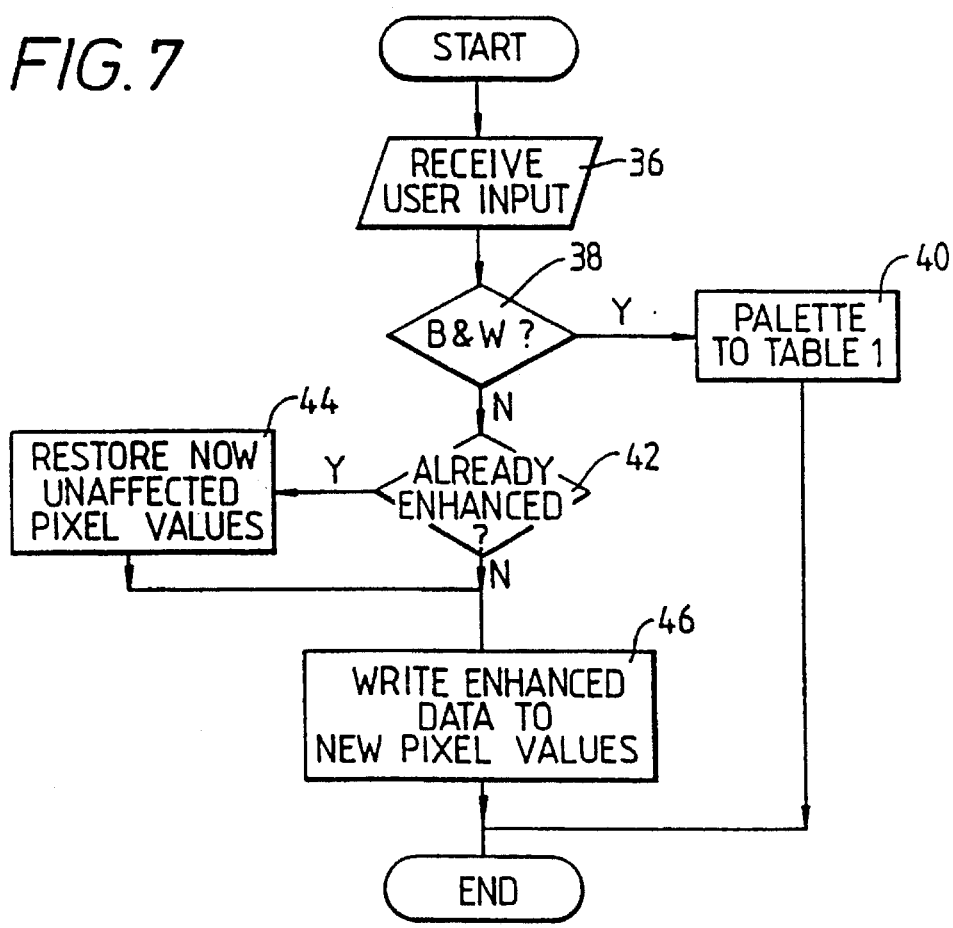
FIG. 7 is a simplified flow diagram illustrating how the modification of the data within the display palette is controlled.

FIG. 7 is a flow diagram illustrating how the data within the display palette 30 is modified in the case of the mapping of FIG. 4. At step 36 the computer receives a user input, such as a mouse movement or keyboard stroke, that signifies a change in the position of the range of enhanced displayable appearances. If it is determined at step 38 that the new appearance is to be fully monochrome, then step 40 returns the data in the palette to that shown in Table 1 and the procedure ends. If the new appearance is not be fully monochrome, then the process passes from step 38 to step 42 where a test is made as to whether or not enhanced displayable appearances are already in use. If such enhanced displayable appearances are already in use, then step 44 returns any pixel values that are currently within the enhanced range but that will be outside this range when it is moved to its new position to their directly displayable values. At step 46 the data for the enhanced range at its new position is written into the display palette 30 via the main bus 4 and buffers 34 under the control of address data supplied via multiplexer 28.

Figure 8:
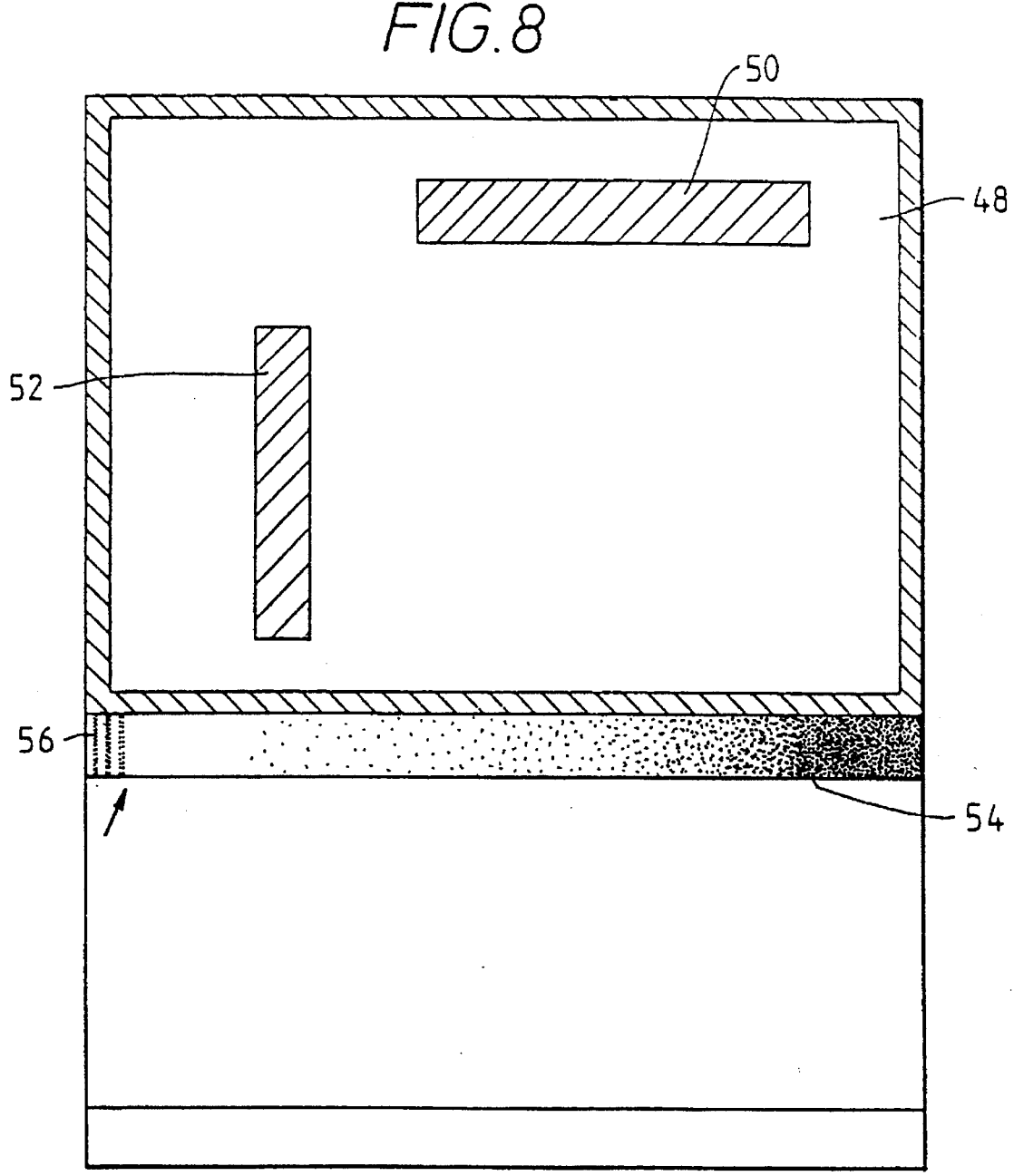
FIGS. 8, 9 and 10 illustrate the user interface in use to analyse an example image.

FIG. 8 illustrates an example image 48 comprised of a horizontal block 50 and a vertical block 52 together with the user interface for controlling the analysis. The horizontal block 50 and the vertical block 52 are of uniform appearance. A bar of monotonically varying pixel values 54 comprising the palette scale representation is displayed beneath the image 48. At the left hand end of the bar 54 is a black and white portion 56 where the range cursor is positioned should it be desired not to use the enhanced displayable appearances feature.

Figure 9:
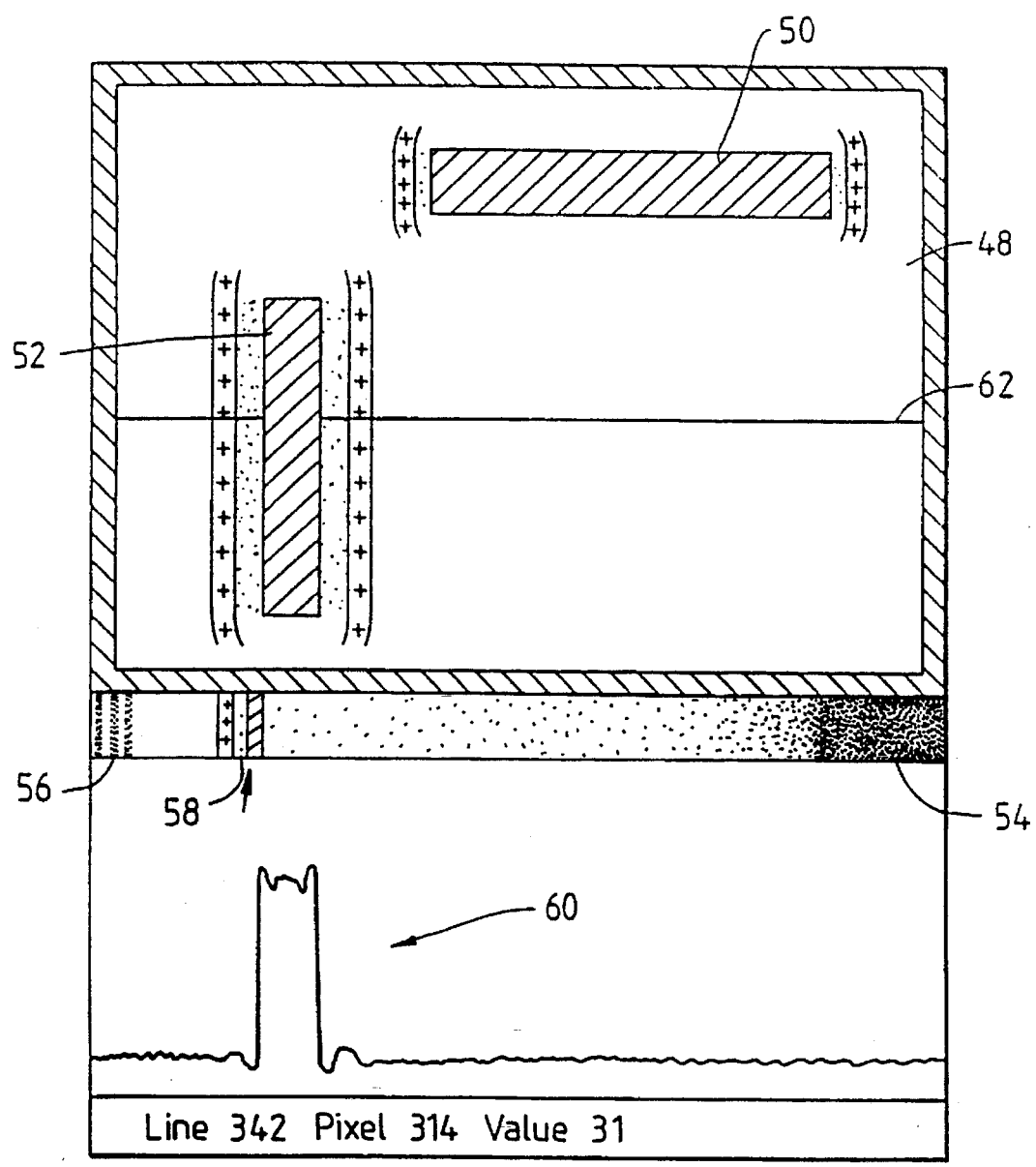

To use the enhanced displayable appearances feature, the user would manipulate the mouse to drag the range cursor controlling the enhanced displayable appearances out of the black and white region 56. This is illustrated in FIG. 9. The range cursor 58 is dragged to a user selected position within the palette scale illustrated by the bar 54. Whilst the enhanced range is being so dragged, the modified mapping data is dynamically written into the display palette 30 so that the effect upon the image 48 can be observed and a suitable position for highlighting a distortion can be readily found.

In the example image shown, the distortion takes the form of a horizontal ringing in the pixel value that occurs after a sudden change in pixel value. Such a ringing could be introduced by inappropriate horizontal filtering. This ringing is of an amplitude such that it would not be readily detectable from the directly representative displayable appearances. However, by mapping the range of pixel values adjacent to the sudden transition to the enhanced range, the slight variation in these pixel values produced by the ringing becomes visible. An additional effect that increases the usefulness of this technique is that if an area contains pixel values that are not within the enhanced range whilst those surrounding it are, then these pixels will stand out as not being coloured. In FIG. 9 the position of the enhanced range 58 is such that the ringing in the background is highlighted.

FIG. 9 also illustrates the feature of the invention whereby a graph 60 of the numeric pixel value along a selectable analysis line 62 is displayed adjacent the image. This graph 60 allows an identified problem to be quantified. In the case shown in FIG. 9, the graph 60 is taken along the analysis line 62 intersecting the vertical block 52.

Figure 10:
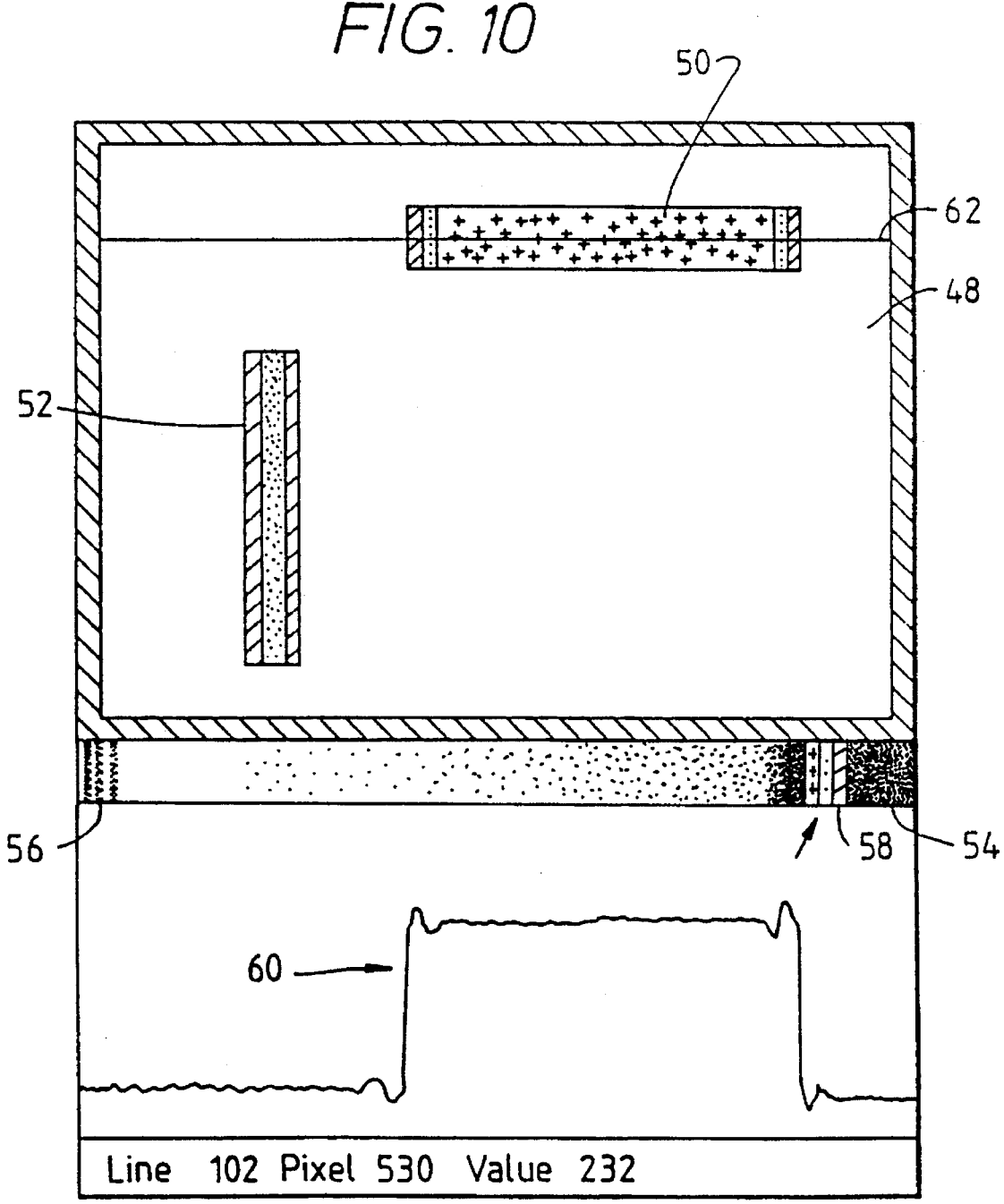

FIG. 10 is similar to FIG. 9 except that the position of the range cursor 58 has been altered so as to highlight the slight variations within the uniform appearances of the horizontal block 50 and the vertical block 52. The position of the analysis line 62 has also been moved so as to intersect the horizontal block 50. Once again, the uses of the enhanced range makes the slight variation in pixel values at the horizontal edges of the blocks more visible.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An image data processing apparatus comprising:

an image memory for storing an array of pixel values representing high resolution image data;

display means for displaying low resolution image data corresponding to said high resolution image data stored in said image memory, said display means including a monitor of a general purpose computer and having low resolving power;

a display palette for storing mapping information defining mapping between each pixel value of said high resolution image data stored in said image memory and an appearance image representing said low resolution image data that are to be displayed on said display means;

user control means responsive to user input for varying a position of a cursor within a linear scale displayed on said display means;

modifying means for modifying said mapping information stored in said display palette based on said position of said cursor so as to enhance said appearance image displayed on said display means; and display control means coupled to said image memory, said display palette and said display means for controlling the same so as to cause the enhanced appearance image representing said low resolution image data to be displayed in response to the modified mapping information provided by said modifying means.

* * * * *